United States Patent [19]

Ozimek

[11] Patent Number: 5,061,442
[45] Date of Patent: Oct. 29, 1991

[54] METHOD OF FORMING A THIN SHEET OF AN AMALGAM

[75] Inventor: Edward J. Ozimek, Penfield, N.Y.

[73] Assignee: Eastman Kodak Company, Rochester, N.Y.

[21] Appl. No.: 594,892

[22] Filed: Oct. 9, 1990

[51] Int. Cl.[5] ............................................. C22C 7/00
[52] U.S. Cl. .................................................... 420/526
[58] Field of Search ........................................ 420/526

[56] References Cited

U.S. PATENT DOCUMENTS

| | | | |
|---|---|---|---|
| 3,087,811 | 4/1963 | Freeberg | 420/526 |
| 3,578,439 | 5/1971 | Merriman | 420/526 |
| 4,435,611 | 3/1984 | Ohsawa | 174/68.5 |

Primary Examiner—Peter D. Rosenberg
Attorney, Agent, or Firm—Donald S. Schaper

[57] ABSTRACT

A solid, thin sheet of an amalgam is formed by first mixing together a liquid metal and one or more powdered metals to form the amalgam in liquid form. The liquid amalgam is then spread out over a surface to form a thin layer of the liquid amalgam. The temperature of the thin layer of amalgam is then reduced to below the melting temperature of the liquid metal in the amalgam to form a solid sheet of the amalgam. The solid thin sheet of amalgam can then be removed from the surface. The solid thin sheet of amalgam can be stored at the lower temperature until it is desired to use the amalgam.

15 Claims, 1 Drawing Sheet

METHOD OF FORMING A THIN SHEET OF AN AMALGAM

FIELD OF THE INVENTION

The present invention relates to a method of forming thin sheets of an amalgam, and, more particularly, to a method of forming solid sheets of amalgam which can be stored and used for various purposes at a desired later time.

BACKGROUND OF THE INVENTION

An amalgam is a mixture of a liquid metal, such as mercury or gallium, and one or more powdered metals, such as nickel, copper, silver, gold, antimony, tin, cobalt, magnesium, antimony, manganese, chromium, titanium, molybdenum, aluminum, iron, etc. Amalgams can be formed at or near room temperature but when cured and hardened, have melting temperatures well above room temperature. It has been suggested that amalgams be used as a bonding material for bonding together the parts of a solid state device. For example, for bonding the cover plate to a housing of a solid state device package as described in the copending application of E. Carnall Jr. et al (Ser. No. 07/594,879) filed concurrently herewith and entitled "Hermetically Sealed Microelectronic Package and Method of Making the Same", or for bonding a solid state device to a terminal board as described in the copending application of D. Bull et al. (Ser. No. 07/594,786), filed concurrently herewith and entitled "Bonding of Solid State Device to Terminal Board". The use of an amalgam as a bonding material in solid state devices is particularly useful where the device cannot withstand the high temperature required for most solders which are generally used, but where the bonding material must hold the bond at the elevated temperatures at which the solid state device may operate. In order to facilitate the use of an amalgam as a bonding material, it would be desirable to have the amalgam in the form of a solid preform of a shape and size to correspond with the parts to be bonded together. Therefore, it would be desirable to be able to form an amalgam into a solid sheet from which the preforms could be formed. However, the solid sheet must be able to be stored for periods of time after being formed until it is required for use.

SUMMARY OF THE INVENTION

The present invention is directed to a method of forming a solid, sheet of an amalgam by first mixing together the ingredients of the amalgam to form the amalgam in liquid form. The amalgam is then spread out on a surface, such as with a roller, or a doctor blade, or by centrifugal force, to form a layer of the amalgam. The temperature of the layer of amalgam is then reduced to below the melting temperature of the liquid metal of the amalgam to freeze the layer into a solid sheet. The solid sheet of amalgam is then removed from the surface and can be stored in solid form at the lower temperature until it is ready to be used. The solid thin sheet of amalgam can be cut or otherwise formed into any desired shape to form a bonding preform or for any other desired purpose.

More particularly, the present invention is directed to a method of making a solid sheet of an amalgam comprising mixing together a liquid metal and a powdered metal to form an amalgam in liquid form. The liquid amalgam is spread out on a surface to form a thin layer of the amalgam. The temperature of the thin layer is then lowered below the melting temperature of the liquid metal to form a thin solid sheet of the amalgam.

Viewed from one aspect, the invention comprises a method of making a solid sheet of amalgam suitable for subsequent use. The method includes the steps of mixing together a liquid metal and a powdered metal to form the amalgam in liquid pourable form at a temperature of at least the melting temperature of the liquid metal; spreading the liquid amalgam before it begins to stiffen on a surface to form a layer of the amalgam having a desired thinness; and lowering the temperature of the liquid layer of amalgam before it begins to stiffen below the melting temperature of the liquid metal in the amalgam to form a solid piece of the amalgam which can be handled and stored as a structural piece and subsequently used.

The invention will be better understood from the following more detailed description taken with the accompanying drawings.

Figure 1:
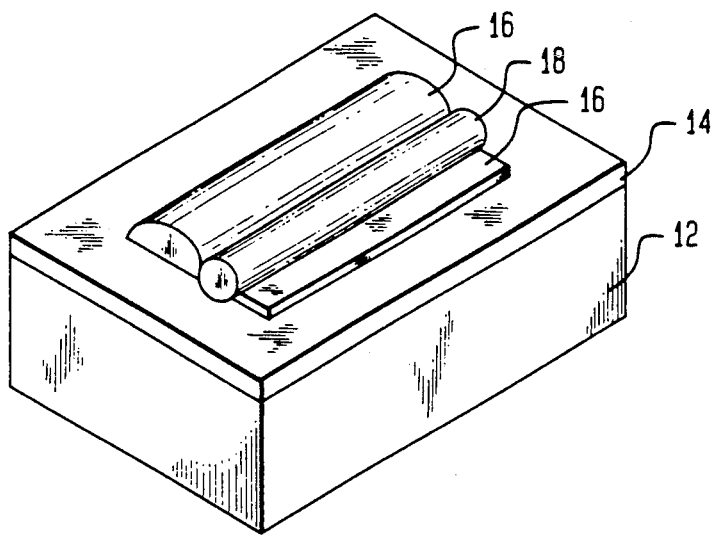
FIG. 1 is a perspective view of one form of an apparatus for carrying out the method of the present invention.

It should be understood that the views are not necessarily drawn to scale.

DETAILED DESCRIPTION

The method of the present invention for forming a solid, thin sheet of an amalgam comprises first mixing together the ingredients of the amalgam in liquid form. An amalgam comprises a mixture of a liquid metal, such as mercury or gallium, and a powdered metal, such as nickel, copper, silver, gold, antimony, tin, cobalt, magnesium, manganese, chromium, titanium, molybdenum, aluminum, iron or mixtures thereof. In general, the liquid metal is present in the mixture in the amount of 55% to 95% by weight. When the amalgam is to be used in a solid state device, gallium is preferred as the liquid metal because mercury is toxic and can adversely affect the electrical characteristics of certain types of solid state devices. Copper and nickel are preferred as the powdered metal because they form amalgams which have desirable properties, are relatively inexpensive and are readily available. In amalgams containing gallium as the liquid metal and powdered copper and/or nickel, the gallium is preferably present in the amount of 65% to 70% by weight. The ingredients of the amalgam may be mixed together manually using a container and a stainless steel pestle with a hammering action.

However, it can also be achieved using a commercially available amalgamator, which is a device having a vibratory arm which holds a capsule containing the mixture along with a pestle to provide the hammering action. In an amalgamator, the ingredients can be mixed together in a matter of seconds, 15 seconds or more. When the ingredients are mixed together, the amalgam is in a liquid state and can be very fluid.

The liquid amalgam is then poured onto a surface and spread out into a thin layer. Since, once the ingredients of the amalgam are mixed together, the amalgam has a work life of about one hour before it begins to stiffen, the liquid amalgam should be poured onto the surface as soon as possible after it is mixed together. Also, to facilitate spreading the amalgam over the surface, it should be kept at a temperature above the melting temperature of the liquid metal of the amalgam, which for gallium is about 30° C. The surface onto which the amalgam is poured should be of a material to which the amalgam will not readily stick. Polytetrafluoroethylene and other similar plastics are highly suitable for this purpose.

Immediately following the spreading of the amalgam into a thin layer, the temperature of the amalgam is reduced to below the melting temperature of the liquid metal. This can be achieved by placing the amalgam in a freezer or similar cooling apparatus. This freezes the amalgam into a solid thin sheet which then can be removed from the surface on which it was spread out. Once the amalgam is in a solid form, it can be cut or otherwise formed into any desired shape and size, such as may be required for a bonding preform or for any other purpose. Since the amalgamation process is thermally driven, keeping the amalgam at a low temperature retards the reaction between the liquid metal and the powdered metal or metals. Thus, the solid sheet of amalgam can be stored at the reduced temperature for a long period of time, and the amalgam used when ever desired. If the solid, thin sheet of amalgam is also stored in an inert atmosphere, a reducing gas atmosphere or a vacuum, possible oxidation effects can be eliminated. Thin, solid sheets of amalgam at the reduced temperature have been stored for up to one year and when melted were found to be usable.

The liquid amalgam can be spread out over the surface by various techniques. One technique is splatter forming the thin layer by rapidly impinging the material on the surface from the mixture vessel. Although this technique is a clean and quick method, it has the disadvantage that the surface quality and thickness of the resulting layer is not uniform.

Referring to FIG. 1, there is shown a perspective view of an apparatus 10 for carrying out another technique for spreading the liquid amalgam into a thin layer. The apparatus 10 comprises a base plate 12 having a surface layer 14 of polytetrafluoroethylene or other similar plastic. The amalgam 16 is poured onto the surface layer 14, and a cylindrical roller 18 is rolled back and forth across the amalgam 16 until the amalgam 16 is rolled out into a layer of the desired thickness. This technique has the disadvantages that the roller can contaminate the amalgam and there may be thickness variations in the resulting thin layer.

Figure 2:
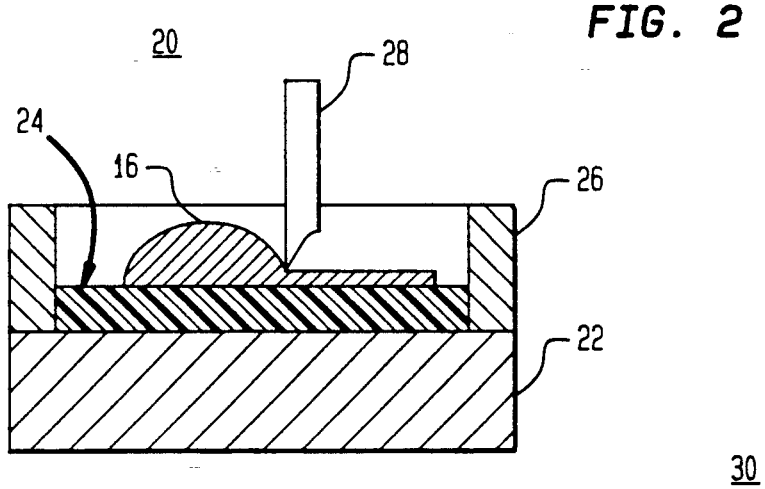
FIG. 2 is a sectional view of another form of an apparatus for carrying out the method of the present invention.

Referring to FIG. 2 there is shown another apparatus 20 for carrying out another technique for spreading the liquid amalgam into a thin layer. The apparatus 20 comprises a base plate 22 having a plastic surface layer 24. If desired, an upright wall 26 may be provided around the edge of the base plate 22. The amalgam 16 is poured onto the surface layer 24 and a doctor blade 28 is passed over the amalgam to spread it out over the surface layer 24. The doctor blade 28 has a machined spreading surface and a precise standoff to control the blade to surface separation. The doctor blade 28 is drawn over the fluid amalgam 16 yielding a layer of relatively uniform thickness. This technique has limitations regarding the width of the doctor blade 28 and possible contamination from the contact of the doctor blade 28 with the amalgam 16.

Figure 3:
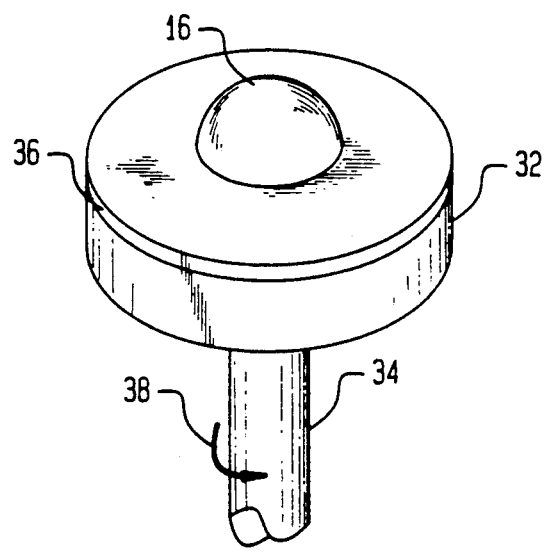
FIG. 3 is a perspective view of still another form of an apparatus for carrying out the method of the present invention.

Referring to FIG. 3 there is shown still another apparatus 30 for use in spreading out the liquid amalgam into a thin layer. Apparatus 30 comprises a circular base plate 32 mounted on a shaft 34 which extends perpendicularly from the bottom surface of the plate 32. A surface layer 36 of a suitable plastic is on the top surface of the plate 32. The shaft 34 is connected to a motor or other means, not shown, for rotating the shaft and the base plate, such as in the direction of the arrow 38. The liquid amalgam 16 is placed on the surface layer 36 and the base plate 32 is rotated so as to spin the amalgam 16. The centrifugal force generated by the spinning causes the amalgam 16 to spread out over the surface layer 36 to form the amalgam 16 into a thin layer. This technique has the advantage that there is no contact with the amalgam layer and a controlled thickness can be obtained by controlling the rotational speed and time.

Thus, there is provided by the present invention a method of forming an amalgam into a solid, thin sheet which can be stored for long periods of time and then used when desired. The thin sheet of amalgam can be made into sheets of various thickness and area sizes. Once the thin sheet of amalgam is formed, it can be cut or other formed into any desired geometric shape which can be stored for future use.

It is to be appreciated and understood that the specific embodiments of the invention are merely illustrative of the general principles of the invention. Various modifications may be made consistent with the principles set forth. For example, the thin sheet of amalgam can be made into any desired thickness and area configuration. Also, any other well known technique for spreading a liquid material into a thin layer can be used. Also, the method of the present invention can be applied to an amalgam of any composition so long that it is formed in a liquid form and spread out in liquid form.

What is claimed is:

1. A method of making a solid sheet of an amalgam suitable for subsequent use comprising the steps of:

mixing together a liquid metal and a powdered metal to form the amalgam in liquid pourable form at a temperature of at least the melting temperature of the liquid metal;

spreading the liquid amalgam before it begins to stiffen on a surface to form a layer of the amalgam having a desired thinness; and lowering the temperature of the liquid layer of amalgam before it begins to stiffen below the melting temperature of the liquid metal in the amalgam to form a solid sheet of the amalgam which can be handled and stored as a structural piece and subsequently used.

2. The method of claim 1 wherein the liquid metal is either mercury or gallium.

3. The method of claim 2 wherein the powdered metal is selected from the group consisting of nickel, copper, silver, gold, antimony, tin, cobalt, magnesium, antimony, manganese, chromium, titanium, molybdenum, aluminum, iron and combinations thereof.

4. The method of claim 3 wherein the liquid metal is present in the mixture in the amount of 55% to 95% by weight.

5. The method of claim 1 wherein the liquid amalgam is spread out on a surface of a material to which the amalgam will not readily adhere.

6. The method of claim 5 wherein the surface is of a plastic.

7. The method of claim 1 wherein the liquid amalgam is spread out on the surface by rapidly impinging the amalgam on the surface to splatter the amalgam over the surface.

8. The method of claim 1 wherein the liquid amalgam is spread out on the surface by placing the amalgam on the surface and rolling a cylindrical roller over the amalgam until the amalgam is spread out over the surface.

9. The method of claim 1 wherein the liquid amalgam is spread out over the surface by placing the liquid amalgam on the surface and moving a doctor blade over the amalgam to spread the amalgam out.

10. The method of claim 1 wherein the liquid amalgam is spread out over the surface by placing the amalgam on the surface and rotating the surface to spread the amalgam out over the surface by centrifugal force.

11. The method of claim 1 further comprising removing the solid sheet of amalgam from the surface after the amalgam is cooled to below the melting temperature of the liquid metal.

12. The method of claim 1 further comprising storing the solid sheet of amalgam at a temperature low enough so that the solid sheet when melted again is useable as required.

13. The method of claim 12 in which the solid sheet of amalgam is stored in an inert gas, reducing gas or vacuum.

14. A method of fabricating and storing for subsequent use a piece of amalgam having suitable thinness and shape and useful for bonding or sealing electronic devices sensitive to high temperature, said method comprising the steps of:

mixing together a liquid metal having a melting temperature at or below about 30° C. with a metal powder to form a fluid mixture which in a short time near said melting temperature begins to stiffen;

quickly thereafter before the fluid metal mixture begins to stiffen and at a temperature above the melting point of the liquid metal, spreading the still fluid metal mixture onto a surface to form a substantially uniform layer of the metal mixture having a desired thinness;

lowering the temperature of the liquid metal mixture layer to freeze it into a solid layer;

removing the solid metal layer from the surface and forming it into a piece having a desired shape for subsequent use; and maintaining the piece at a temperature which is low enough to inhibit amalgamation of the piece for a useful period of time such that when the piece is subsequently used it melts to seal or bond a device at a low enough temperature so as to not damage the device and the piece subsequently amalgamates so as to form an amalgamated piece which has a high enough melting point to be compatible with the operating temperature of the device.

15. The method in claim 14 in which the liquid metal is gallium and is present in the amount of 55% to 95% by weight.

* * * * *